United States Patent
Edanami

(10) Patent No.: US 7,149,822 B2
(45) Date of Patent: Dec. 12, 2006

(54) INFORMATION STORAGE DEVICE HAVING INTERNAL DEFRAGMENTATION CAPABILITY

(75) Inventor: Hiroyuki Edanami, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/320,570

(22) Filed: Dec. 16, 2002

(65) Prior Publication Data

US 2003/0200384 A1 Oct. 23, 2003

(30) Foreign Application Priority Data

Apr. 23, 2002 (JP) ............... 2002-120241

(51) Int. Cl.
*G06F 3/00* (2006.01)
*G06F 13/00* (2006.01)
*G06F 13/14* (2006.01)

(52) U.S. Cl. ............... 710/18; 710/19; 710/15; 710/8; 710/14

(58) Field of Classification Search ............... 709/100; 711/170, 213; 710/5, 33, 6, 8, 14, 15, 18, 710/89, 58, 59; 348/156
See application file for complete search history.

(56) References Cited

U.S. PATENT DOCUMENTS

| | | | |
|---|---|---|---|
| 5,367,509 A | | 11/1994 | Fukumoto et al. ............ 369/13 |
| 5,761,680 A | * | 6/1998 | Cohen et al. ............... 709/100 |
| 6,205,529 B1 | * | 3/2001 | Shagam ..................... 711/170 |
| 6,317,818 B1 | * | 11/2001 | Zwiegincew et al. ........ 711/213 |
| 6,570,610 B1 | * | 5/2003 | Kipust ........................ 348/156 |
| 6,735,678 B1 | * | 5/2004 | Noble et al. ................ 711/165 |
| 6,883,063 B1 | * | 4/2005 | Blumenau et al. ............ 710/33 |

FOREIGN PATENT DOCUMENTS

| | | |
|---|---|---|
| JP | 4-258831 | 9/1992 |
| JP | 7-029238 | 1/1995 |
| JP | 7-262643 | 10/1995 |
| JP | 8-044500 | 2/1996 |
| JP | 8-076939 | 3/1996 |
| JP | 9-198195 | 7/1997 |
| JP | 2000-084690 | 3/2000 |
| JP | 2000-182292 | 6/2000 |

* cited by examiner

Primary Examiner—Fritz Fleming
Assistant Examiner—Joshua D Schneider
(74) Attorney, Agent, or Firm—Greer, Burns & Crain, Ltd

(57) ABSTRACT

To improve a throughput of information storage devices by reducing the number of discontiguous information files, in an MO drive, a CPU operates in accordance with a program stored in a program storage circuit to determine whether transmission of instructions from a host is intermitted and, if the transmission is intermitted, the CPU rearranges information files discontiguously stored on an MO disk.

4 Claims, 16 Drawing Sheets

INFORMATION STORAGE DEVICE HAVING INTERNAL DEFRAGMENTATION CAPABILITY

BACKGROUND OF THE INVENTION

1. Field of the Invention

The present invention relates to an information storage device that writes and reads information files to and from a recording medium according to instructions from a higher-level device.

2. Description of the Related Art

Information storage devices such as an MO (Magneto-optical disk) drive and HDD (Hard disk drive) are known that are used as auxiliary storage devices of higher-level devices (hosts) typified by personal computers. Such an information storage device is internally or externally connected to the host and reads and writes an information file to and from a recording medium in response to an instruction from the host. In the information storage device, components of an information file may often be stored in discontiguous areas on a recording medium.

FIG. 1 shows an example in which components of a single information file are stored in discontiguous areas on a recording medium.

The exemplary recording medium shown in FIG. 1 is an MO disk 1 on which information is recorded using magneto-optical recording technology. A large number of arched sectors are provided in spiral or concentric tracks on the MO disk 1. These tracks are divided into concentric zones. An information file is stored along such tracks one-dimensionally. In FIG. 1, components of the information file are stored discontiguously in a discontiguous first area 2a and a second area 2b. A state in which an information file is stored in this way is hereinafter simply referred to as "an information file is discontiguous." The first and second areas 2a and 2b are contained in different zones (zone n and zone x) in the example shown.

An information file may become discontiguous when free recording areas are produced due to write or delete operations performed in the information file and large information file is written in the discontiguous free areas, or when the information file is overwritten with a larger information file produced by a user modifying the existing information file. In such a case, information files are recorded in such a manner that space between them is minimized in order to use efficiently the available space of the recording medium. As a result, a discontiguous information file is produced.

A discontiguous information file slows down the so-called throughput, which represents time required to perform a read or write operation.

FIG. 2 shows a time chart of an operation for writing an information file in discontiguous free areas.

First, at time T1, a host provides the address of a file system area in which the storage state of the file is recorded to the information storage device and also provides a command for reading data stored at that address in order to know the storage state of the file on the recording medium. The information storage device performs a test write/read (step 3) in a test track in the file system area to obtain conditions such as an optimum write power, read power, and reproduction magnetic field for accessing the file system area. It then reads (step 4) the file system area under the conditions and sends read data to the host. The host determines based on the sent data that free area is separated into a discontiguous first and second areas as described above and issues at time T2 a command for updating the file system area by adding file system information indicating an information file to be recorded in the first and second areas. The information storage device receives the command and updates (step 5) the file system area. Then, at time T3, the host indicates the address of the first area to the information storage device and sends write data to be recorded in the first area out of the data constituting the information file. The information storage device seeks (step 6) to a test track in a zone containing the first area and performs a test write/read (step 7) in the test track to obtain conditions such as optimum write power. It then seeks (step 8) to the first area and uses the conditions obtained by the test write/read (step 7) to write (step 9) the write data in the first area. Then, at time T4, the host indicates the address of the second area and sends write data to be recorded in the second area. The information storage device seeks (step 10) to a test track in a zone containing the second area and performs a test write/read (step 11) in the test track to obtain conditions such as optimum write power. It then seeks (step 12) to the second area and uses the conditions obtained in the test write/read (step 11) to write (step 13) the write data in the second area.

In this way, when an information file is written in discontiguous free areas, seek operations are required to move between the free areas. In addition, if the free areas are in different zones, a test write/read is required for each free area. As a result, seek and test write/read operations occur frequently, thereby degrading throughput for writing the information file.

FIG. 3 shows a time chart of an operation of reading a discontiguous information file.

First, at time T5, the host provides the address of a file system area to the information storage device and issues a command for reading data stored at the address. The information storage device performs a test write/read (step 14) in a test track in the file system area to obtain conditions such as an optimum write power, read power, and reproduction magnetic field for accessing the file system area. It then reads (step 15) the file system area under the conditions and sends read data to the host. The host determines based on the sent data that the information file is stored in discontiguous first and second areas as described above. Then, at time T6, the host indicates the address of the first area to the information storage device and instructs it to read data stored in the first area. The information storage device seeks (step 16) to a test track in a zone containing the first area and performs a test write/read (step 17) in the test track to obtain conditions such as optimum write power. It then seeks (step 18) to the first area and uses the conditions obtained in the test write/read (step 17) to read (step 19) data stored in the first area. Then, at time T7, the host indicates the address of the second area to the information storage device and instructs it to read data stored in the second area. The information storage device seeks (step 20) to a test track in a zone containing the second area and performs a test write/read (step 21) in the test track to obtain conditions such as optimum write power. It then seeks (step 22) to the second area and uses the conditions obtained by the test write/read (step 21) to read (step 23) data stored in the second area. In some types of MO disks, only test writes are performed without performing test reads. A test write/read may be omitted if the previous test write/read is effective.

In this way, similarly to a write operation, when an information file stored in discontiguous areas is read, seek operations are required to move between the free areas. In addition, if the free areas are contained in different zones, a test write/read is required for each zone. As a result, seek and test write/read operations occur frequently, thereby degrading throughput for reading the information file. The discontiguous information file produces additional discontiguous free areas and discontiguous files when it is deleted or overwritten, thereby further degrading the throughput.

According to the prior art, a host performs an operation called the defragmentation to rearrange components of information files in order to achieve the state that there is no discontiguous information files. While defragmenting, the host refers to a file system and outputs read or write instructions. Thus, defragmenting takes the host away from its other jobs. In addition, defragmentation by the host is instructed by a user when he or she finds that defragmentation is required. While contiguous files resulting from defragmentation may provide adequate throughput shortly after the defragmentation, accesses to the files increase the number of discontiguous information files over a short period of time, thereby degrading the throughput. Nevertheless, it is impractical that the user instructs the host to perform defragmentation at frequent intervals because it is laborious for the user and degrades the entire throughput of the host.

SUMMARY OF THE INVENTION

In light of these problems, an object of the present invention is to provide an information storage device that reduces discontiguous information files to improve its throughput.

To attain the object, the present invention provides an information storage device that at least performs a write of an information file onto a recording medium in accordance with an instruction transmitted from a higher-level device, including: a determination section that determines whether transmission of instructions from the higher-level device is intermitted; and a component rearrangement section that rearranges components of the information file to transform an information file whose components are discontiguously stored on the recording medium into an information file whose components are stored contiguously, if the determination section determines that transmission of instructions is intermitted.

The information storage device according to the present invention performs rearrangement so that components of an information file are placed contiguously during idle time in which instructions from the higher-level device are intermitted. Thus, the rearrangement can be performed without taking the higher-level device away from other jobs. In addition, as the result of the rearrangement, seek time and test read/write time are reduced and therefore time required for processing after receiving a read or write instruction from the higher-level device is reduced, thereby improving throughput.

The information storage device according to the present invention is advantageous in that the recording medium is a recording medium selected from a group consisting of a plurality of types of recording media; and the information storage device further comprises a file rearrangement section that rearranges a plurality of information files recorded on the recording medium in an order according to the type of the recording medium.

MO disks use Z-CAV technology and therefore the storage capacity of zones increases for positions nearer the outer edge of the disks. In a 640 MB medium, the capacity of zone 0 (the zone nearest to the center of the disk) is 39MB, whereas the capacity of zone 10 (the zone nearest to the edge of the disk) is 65 MB. In a 1.3 GB medium, the capacity of zone 0 (the outermost zone) is 88 MB, whereas the capacity of zone 17 (the innermost zone) is 50 MB. In recording media having capacities between 230 MB and 640 MB, the possibility that an information file is scattered among zones is decreased by arranging information files sequentially from the center to the edge. In recording media having capacities between 1.3 GB and 2.3 GB, the possibility that an information file is scattered among zones is decreased by arranging information files from the edge to center.

Adjacent to zone boundaries, areas such as a test track area and a buffer area for preventing ID crosstalk are provided which cannot be used by a user. Therefore, even if components of an information file are placed sequentially according to their logical addresses, the information file becomes physically discontiguous when it extends across zones. Furthermore, a test write/read occurs each time a different zone is accessed because conditions such as write power, read power, and a reproduction magnetic field are changed to access the recording medium.

Throughput can be improved by rearranging information files in an order according to the type of a recording medium so that a single information file does not extend across zones.

Rearrangement in an order according to the type of a recording medium may also help to improve throughput in different situations, besides a situation where zones as described above exist. The information storage device including the file rearrangement section can address such situations.

The information storage device according to the present invention is preferably an optical information recording medium on which information is written and read by using light and the recording medium is preferably a magneto-optical medium (MO disk) using magneto-optical recording technology.

An MO disk contains zones like those described above and therefore the throughput can be significantly improved by rearranging components of information files to reduce the number of discontiguous information files.

Information storage devices for reading and writing optical information recording media, including MO disks, are often used as auxiliary storage devices and access frequency is lower than that in HDDs contained in higher-level devices. Thus, there is more idle time during which transmission of instructions from a higher-level device is intermitted and rearrangement of information files and the components of an information file can be performed efficiently.

Rearrangement of information files and components of an information file involves rewriting a file system area in a manner depending on types of file systems. While there are various types of file systems, most of them are alike. Therefore, the need for rewriting file system areas for any file systems can be met by creating firmware applicable to those file systems. Firmware for information storage devices is typically contained in ROM or flash ROM. Variations of file systems can be accommodated by replacing the ROM or using a download tool to download firmware stored in the flash ROM.

The information storage device according to the present invention preferably comprises a first switch that turns on and/or off a power supply in response to an operation; a second switch provided in parallel with the first switch that turns on and/or off the power supply in response to a control signal; and a switch controller that suspends rearrangement at a time when a read or write performed on an information file subject to the rearrangement is ensured and then providing a control signal that turns off the second switch to the second switch if the first switch is turned off in response to a user operation during the rearrangement performed by the component rearrangement section.

The information storage device according to the present invention preferably comprises a first switch that turns on and/or off a power supply in response to an operation; a second switch provided in parallel with the first switch that turns on and/or off the power supply in response to a control signal; and a switch controller that suspends rearrangement at a time when a read or write performed on an information file subject to the rearrangement is ensured and then providing a control signal that turns off the second switch to the second switch if the first switch is turned off in response to a user operation during the rearrangement performed by the file rearrangement section.

Whether rearrangement by the component rearrangement section and the file rearrangement section is performed cannot be known by a higher-level device or a user. Therefore, there is a possibility that the user turns off the information storage device during rearrangement without being aware of the rearrangement. If power to the information storage device is turned off during rearrangement, contiguity between components of an information file can be lost and the information file can become inaccessible. The second switch and the switch controller ensure successful accesses to the information file even if the information storage device is carelessly turned off by the user.

The information storage device according to the present invention reduces the number of discontiguous information files and therefore improves throughput, as described above.

DETAILED DESCRIPTION OF THE PREFERRED EMBODIMENTS

Embodiments of the present invention will be described below.

Figure 1:
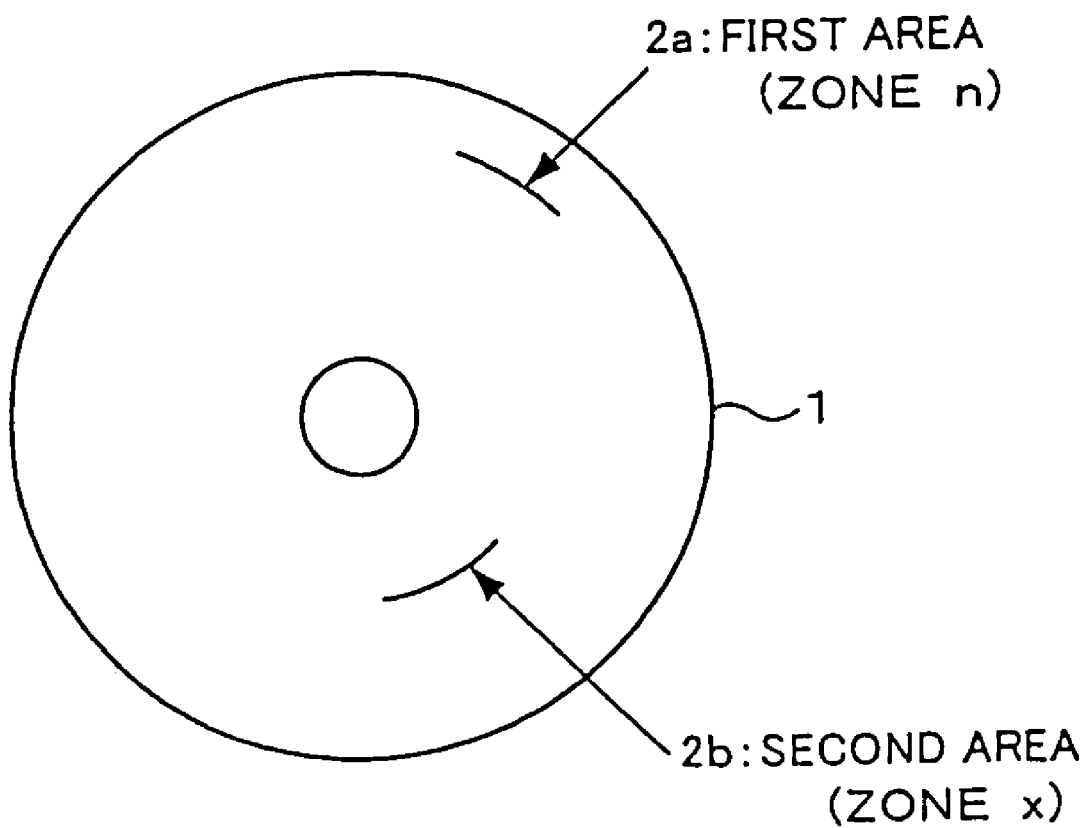
FIG. 1 shows an example in which components of a single information file are stored in discontiguous areas on a recording medium.
Figure 2:
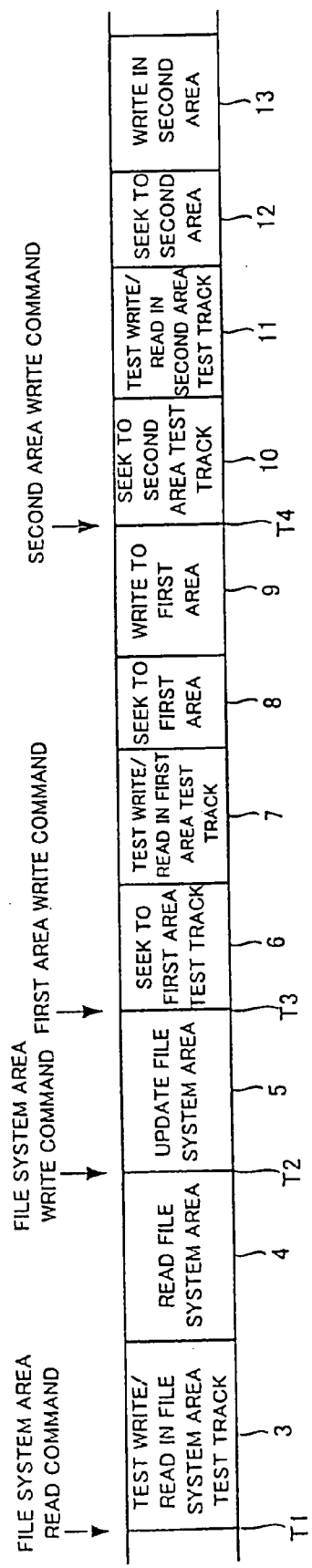
FIG. 2 shows a time chart of a write operation in which an information file is written into discontiguous free areas.
Figure 3:
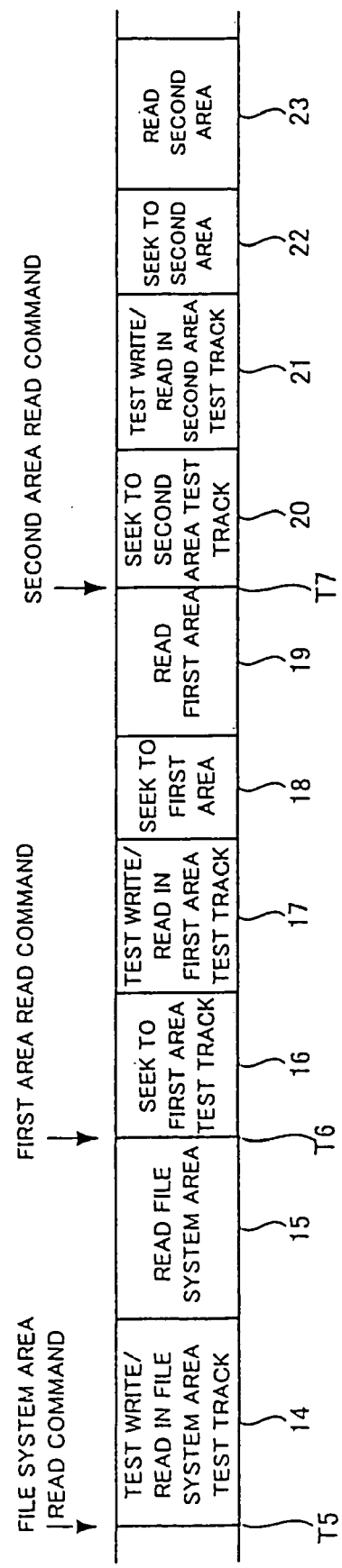
FIG. 3 shows a time chart of a read operation in which a discontiguous information file is read.

An MO drive will be described herein that is configured as one embodiment of an information storage device of the present invention for writing and reading information to and from an MO disk 1 shown in FIG. 1. The MO drive is loaded with and holds a cartridge containing an MO disk. There are different types of MO disks having different storage capacities.

Figure 4:
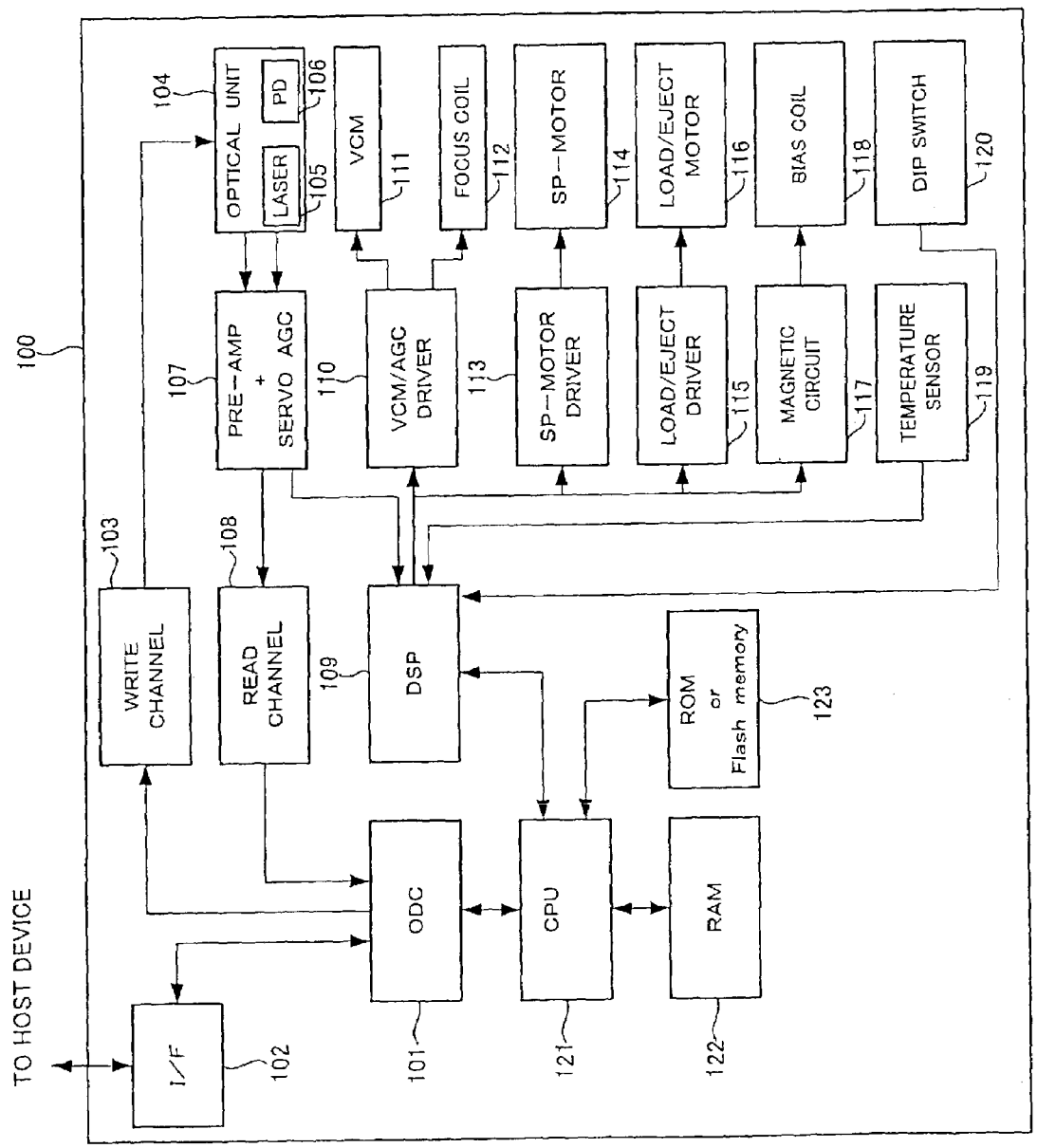
FIG. 4 shows an MO drive as one embodiment of an information storage device according to the present invention.

FIG. 4 shows an MO drive, which is one embodiment of an information storage device of the present invention. Power circuitry, which will be described later, is omitted from FIG. 4.

An optical disk controller (ODC) 101 is provided in the MO drive 100. The optical disk controller 101 controls read and write operations on the MO disk. The optical disk controller 101 receives a command from a host (higher-level device) through an interface 102 and decodes the command to perform an operation indicated by the command. Also provided in the MO drive 100 is a digital signal processing circuit (DSP) 109. The DSP 109 controls basic operations of the MO drive 100, such as rotation-driving, loading, and ejecting an MO disk and tracking and focusing on the MO disk.

An MO disk is loaded in and ejected from the MO drive 100 by the DSP 109 controlling a load/eject motor 116 through a load/eject driver 115. The rotation-driving of the MO disk loaded in the MO drive 100 is controlled by the DSP 109 controlling a spindle motor 114 through a spindle motor driver 113.

During an information recording operation, record data representing an information file is sent from the host to the optical disk controller 101 through the interface 102 together with a command indicating an information write operation. The sent data is divided into pieces of data that correspond to sectors, which are slices of a track. An error correction code (ECC) or cyclic redundancy check (CRC) is added to data in each sector and converted into a (1, 7) code or (2, 7) code by the optical disk controller 101 and inputted into a write channel 103. In the write channel 103, the (1, 7) code or the like is further converted into an on/off signal for mark-position recording or edge recording (or mark-length recording).

An optical unit 104 containing a laser diode 105 and a photodiode (PD) 106 for each particular use is provided in the MO drive 100. The on/off signal resulting from the conversion in the write channel 103 is input into the laser diode 105 and a laser beam corresponding to the on/off signal is emitted from the laser diode 105. The laser beam is focused on the MO disk by a focusing optical system, which is not shown. A magnetic field generation signal is provided from the DSP 109 and inputted into a magnetic circuit 117. The magnetic circuit 117 provides an electric current corresponding to the magnetic field generation signal to a bias coil 118 to apply an erase magnetic field for erasing information or a recording magnetic field for recording information to the MO disk (if an overwrite medium is used, the erase operation is not performed). The information file is written onto the MO disk by the magnetic field and laser beam.

During an information reproduction, on the other hand, a continuous laser beam having predetermined intensity is emitted from the laser diode 105 of the optical unit 104. The intensity of the laser beam is monitored by a monitoring photodiode 106 to automatically stabilize the intensity. The MO disk is also irradiated with the continuous laser beam emitted from the laser diode 105 through the focusing optical system. If an MO disk that requires a reproduction magnetic field is used, a magnetic field generation signal is provided from the DSP 109 to the magnetic circuit 117 and an electric current corresponding to the magnetic field generation signal is supplied to the bias coil 118 by the magnetic circuit 117 to apply a reproduction magnetic field to the MO disk. The MO disk irradiated with a laser beam with such a reproduction magnetic field being applied provides reflected light according to information recorded on the MO disk. The reflected light is received by a photodiode 106 for ID/MO signals and differential-amplified by an amplifier circuit 107 functioning as a signal-detecting preamplifier to detect ID and MO signals. The ID and MO signals are converted into a (1, 7) code or (2, 7) code in a read channel 108 and further converted into read data with ECC or CRC by the optical disk controller 101. Then, error correction is performed based on the ECC or CRC. The data in sectors are combined into reproduction data representing the information file. The reproduction data is transferred to the host through the interface 102.

During either of information recording and reproduction, the DSP 109 obtains a tracking error signal and a focus error signal through PDs 106 designed for obtaining a tracking error signal (TES) and focus error signal (FES) and the amplifier circuit 107 functioning as an automatic gain control (AGC) circuit to detect a tracking error and focus error in the laser beams. Then, the DSP 109 controls a voice coil motor (VCM) 111 and a focus coil 112 through a VCM/AGC driver 110 to minimize the error. The DSP 109 also causes the VCM/AGC driver 110 and voice coil motor (VCM) 111 to perform a seek to a target track for reading or writing information according to a command decoded by the ODC 101 and provided through a central processing unit (CPU) 121.

A temperature sensor 119 is provided in the vicinity of the MO disk loaded in the MO drive 100. The temperature of the MO disk is measured by the temperature sensor 119 and a reproduction magnetic field and laser power are set according to the temperature.

A DIP switch 120, which is operated by a user, is used to set various settings such as a SCSI channel setting.

The above described operations and a process for rearranging a discontiguous information file in the MO drive 100 which will be described later, are performed in accordance with instructions from CPU 121 which are caused by a program stored in a program memory circuit 123 implemented by ROM or flash memory. The RAM 122 also temporarily stores the results of operations performed by the CPU 121.

The configuration shown in FIG. 4 is one example of MO drive configuration. The above described CPU 121 in the MO drive may be replaced with an MPU. The ODC 101, DSP 109, and CPU 121 may be one integral computation control means.

A layout of an MO disk will be described below.

Figure 5:
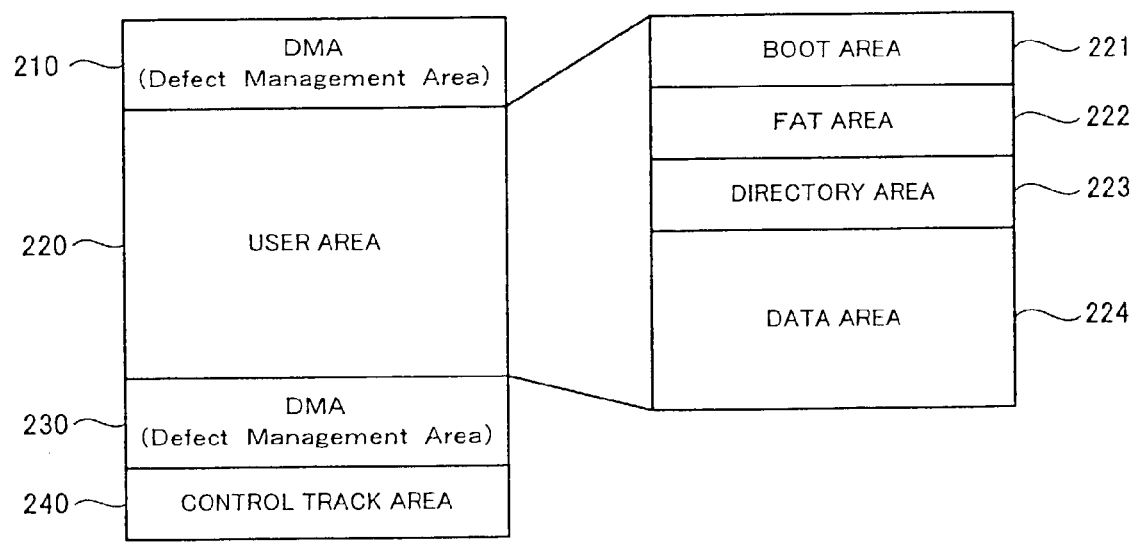
FIG. 5 shows a layout of an MO disk.

FIG. 5 shows a layout of an MO disk.

Provided on the MO disk is a user area 220 in which a user can read and write an information file through an MO drive. The user area 220 occupies most of a large number of tracks provided on the MO disk. When the user area 220 is formatted by for example a FAT 16 file system, which is a file system commonly used, there are created a boot area 221 containing drive information for driving the FAT 16 file system, a FAT area 222 for storing a file allocation table (FAT) indicating where and how information files are stored on the MO disk on the basis of a cluster consisting of a plurality of sectors, a directory area 223 for storing directory information indicating a directory structure, and a data area 224 for storing data representing the content of the information files.

The MO disk also contains, in addition to the user area 220, areas used by the MO drive for internal processing performed. Shown in FIG. 5 are DMAs (Defect Management areas) 210 and 230, each of which is provided at the inner and outer circumference of the disk with respect to the user area 220, and a control track area 240 in which conditions for the MO disk to be used in an MO drive are recorded as pits and lands during a manufacturing process of the MO disk. When the MO disk is loaded in an MO drive, the MO drive reads the conditions recorded in the control track area 240 and initializes the MO drive based on the conditions.

A rearrangement process performed in a layout as described above will be described below.

Figure 6:
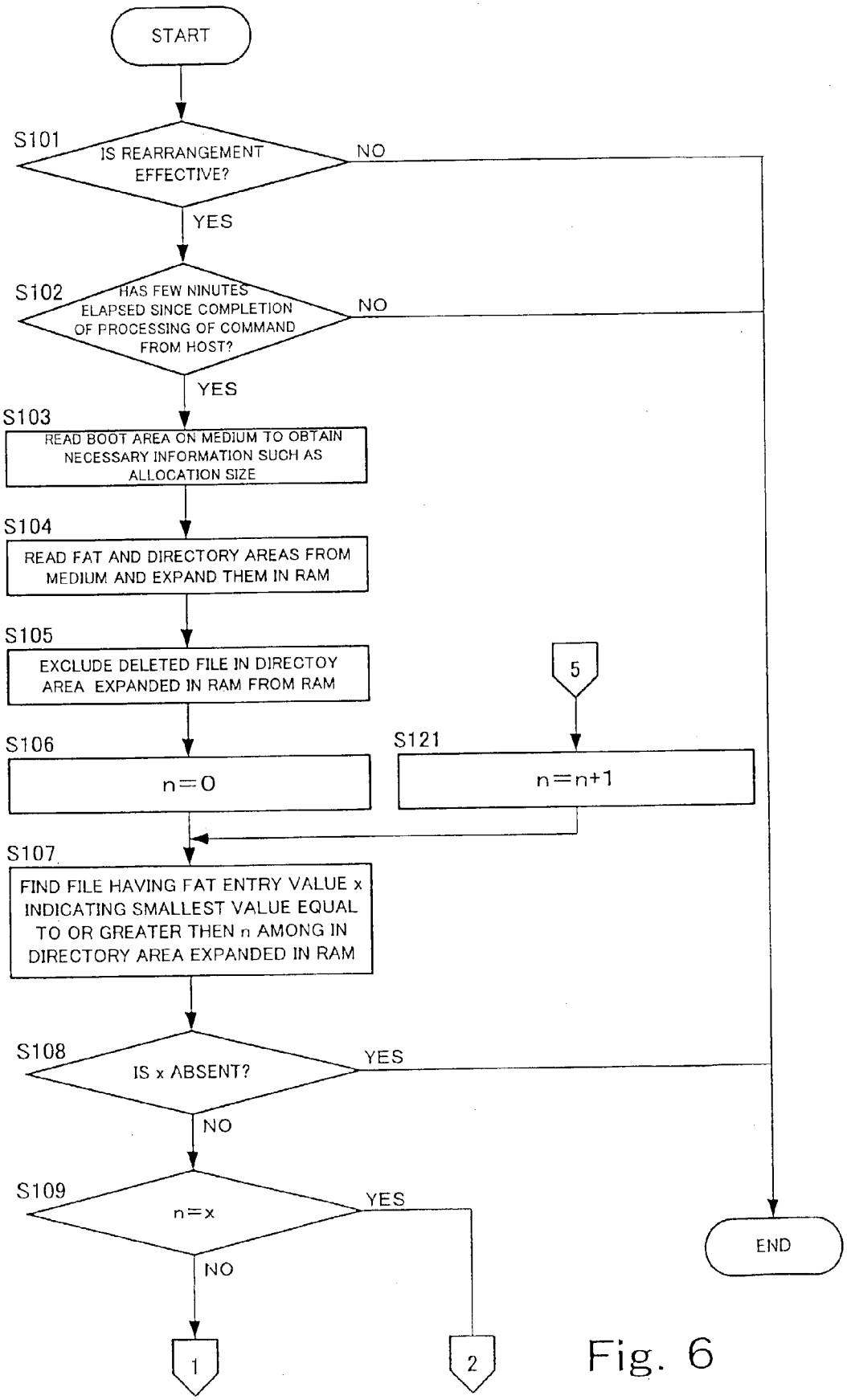
FIG. 6 shows a flowchart of a first half of a rearrangement process.
Figure 7:
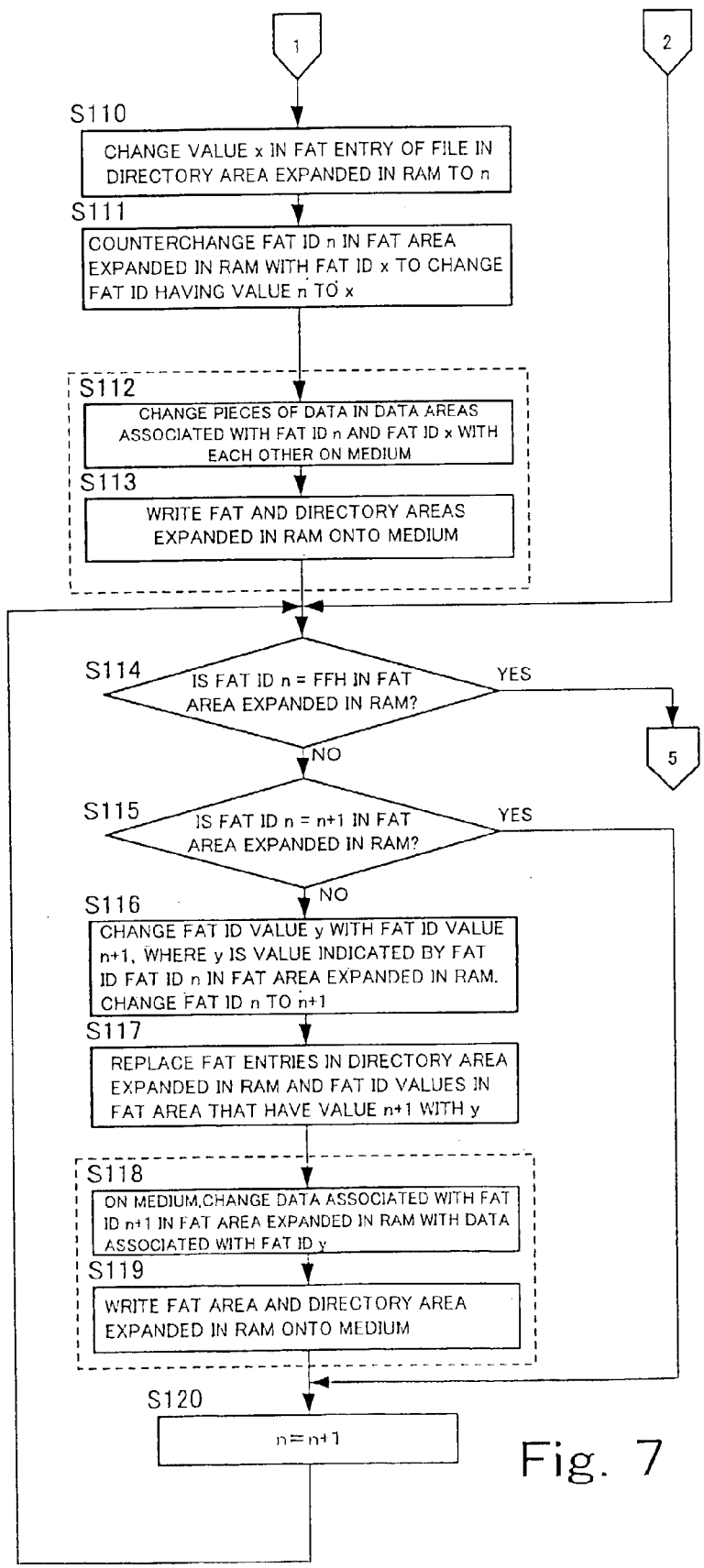
FIG. 7 shows a flowchart of a second half of the rearrangement process.

FIGS. 6 and 7 show flowcharts of a rearrangement process. The process flow continues from step S109 in FIG. 6 to step S110 in FIG. 7.

Figure 8:
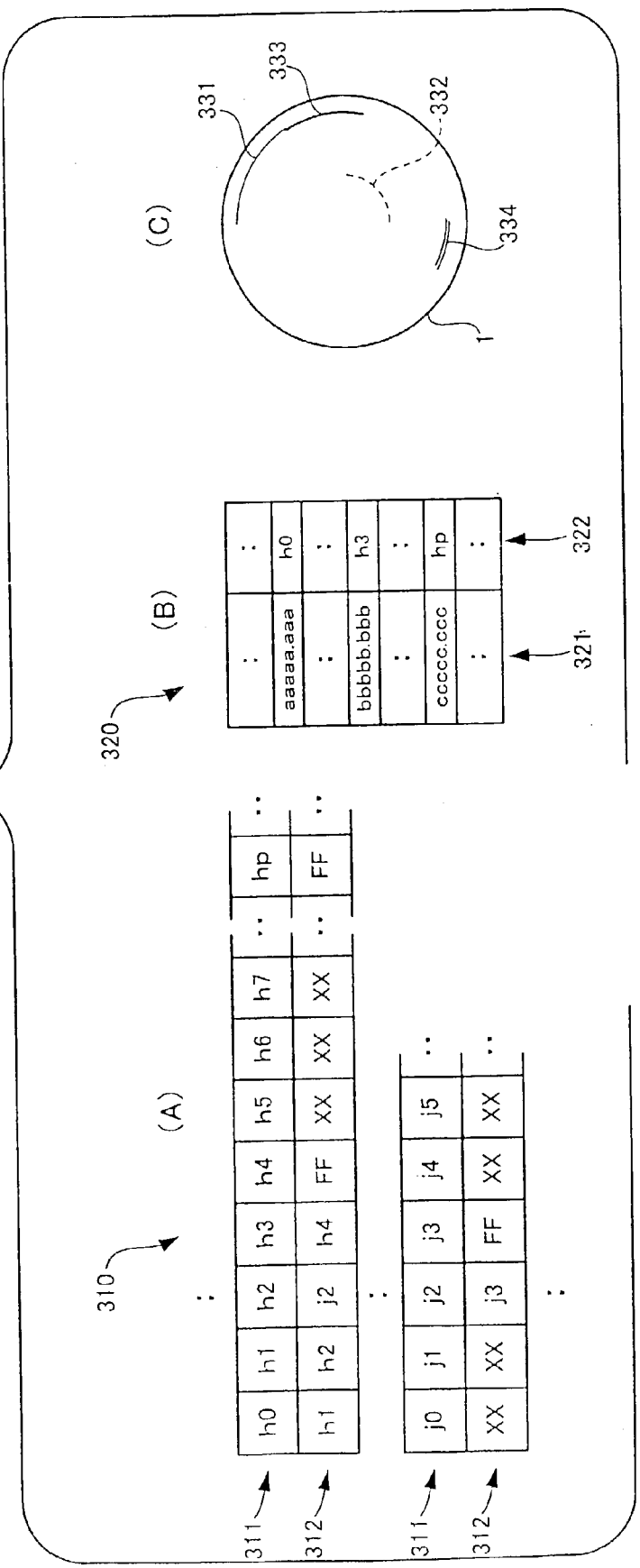
FIG. 8 shows an example of a file allocation table (A) expanded in a RAM, an example of directory information (B) expanded in the RAM, and an example of a storage state (C) in which information files are stored in accordance with the file allocation table and directory information.
Figure 9:
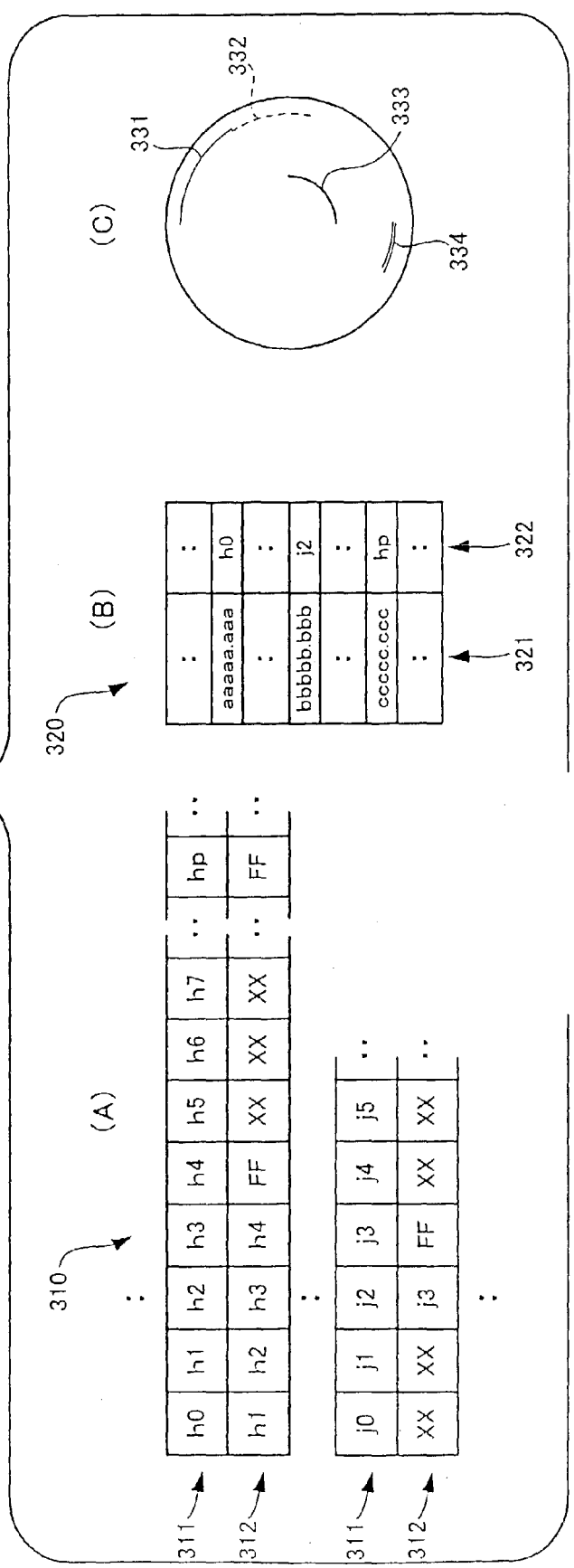
FIG. 9 shows a file allocation table (A) expanded in the RAM after an information file having a file name "aaaaa.aaa" becomes contiguous by the rearrangement process, associated directory information (B) expanded in the RAM, and a storage state (C) in which the information file is stored in accordance with the file allocation table and directory information.
Figure 10:
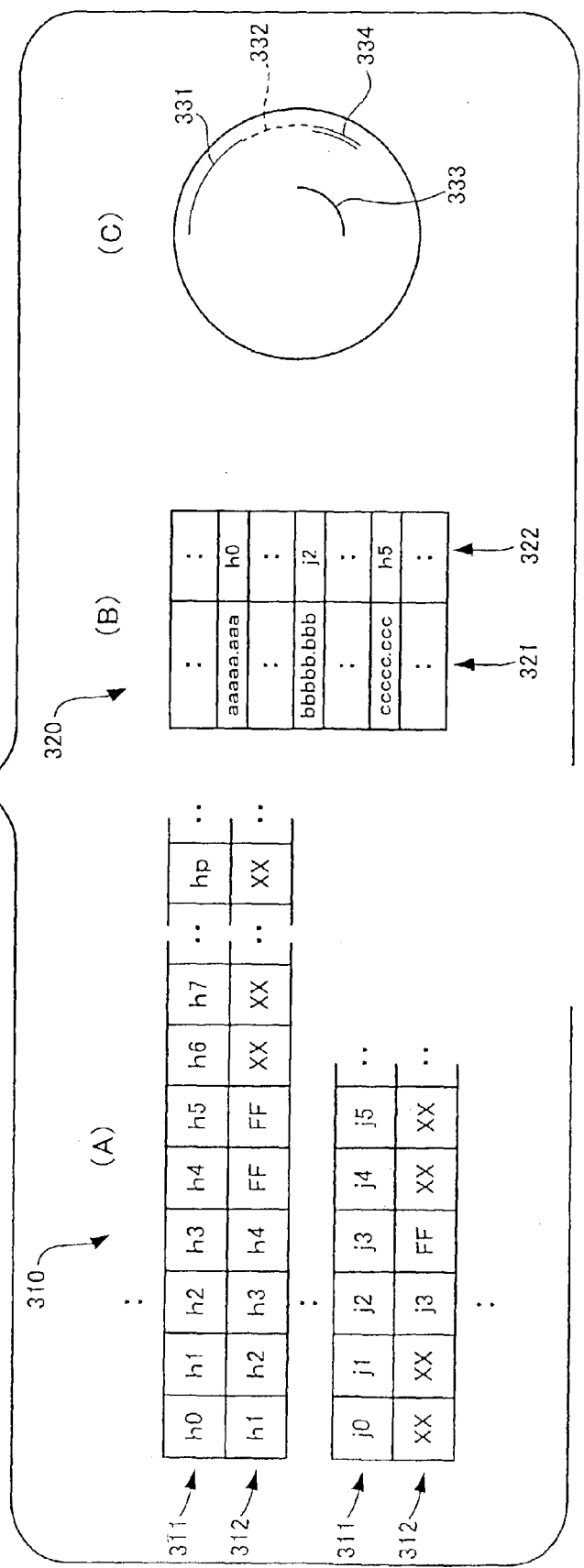
FIG. 10 shows a file allocation table (A) expanded in the RAM after an information file having a file name "ccccc.ccc" is placed in the area following the information file "aaaaa.aaa" by the rearrangement process, associated directory information (B) expanded in the RAM, and a storage state (C) in which the information files are stored in accordance with the file allocation table and directory information.

FIGS. 8, 9, and 10 show an example of information files to be rearranged. Referring to FIGS. 8, 9, and 10, the rearrangement process shown in the flowcharts in FIGS. 6 and 7 will be described below.

As described above, the rearrangement process is performed by the CPU 121 operating in accordance with a program stored in the program memory circuit 123 shown in FIG. 4.

When the rearrangement process is started, it is determined whether the current mode is a mode in which rearrangement of information files is enabled (step S101). The current mode is set by the DSP 109 checking the status of the DIP switch 120 shown in FIG. 4 during power-up or by a command such as a rearrangement disable command sent from the host to the optical disk controller 101 through the interface 102. Data about the set mode is expanded at a predetermined address in the RAM 122. At step S101, data at the predetermined address is read by the CPU to determine the current mode.

If it is determined that the current mode is a mode in which rearrangement is disabled (determination at step S101 is NO), then the rearrangement process ends immediately. On the other hand, if it is determined that the current mode is a mode in which rearrangement is enabled (determination at step S101 is YES), then it is determined whether a predetermined few minutes have elapsed since a command sent from the host was processed (step S102).

Step S102 corresponds to a function of a determination section of the present invention. When the host instructs the MO drive to perform a read or write of an information file by using a file system, the MO drive is required to perform processes indicated by several commands. Therefore, the CPU 121 waits a few minutes after the completion of the process of the last command until it determines that the transmission of the commands ceased, thereby ensuring that the sequence of the processes completely ends. To make this determination, a timer contained in the circuitry of the DSP 109 shown in FIG. 4 is preset by the DSP 109 each time a command process ends and elapsed time measured by the timer is checked by the CPU 121 at step S102.

If it is determined that elapsed time after the completion of the command processes is less than the predetermined few minutes (determination at step S102 is NO), the rearrangement process immediately ends. On the other hand, if it is determined that the predetermined few minutes has elapsed since the completion of the command processes (determination at step S102 is YES), data stored in the boot area on the MO disk is read to obtain necessary information such as an allocation size and stored in the RAM 122 (step S103). A file allocation table stored in the FAT area of the MO disk is also read and expanded in the RAM 122 in a format that can be readily referred to by the CPU 121 in subsequent operations. Similarly, directory information stored in the directory area of the MO disk is read out and expanded in the RAM 122 in a format that can be readily referred to (step S104). While information about information files deleted from the MO disk remains in the directory information with their file names being changed, in order to increase the processing speed of the file system, the deleted information files can be ignored in the rearrangement process and therefore the information about the deleted information file is excluded from the directory information expanded in the RAM 122 (step S105).

FIG. 8 shows an exemplary file allocation table (A) expanded in the RAM 122, exemplary directory information (B) expanded in the RAM 122, and an example of a storage state (C) of information files in accordance with the file allocation table and directory information.

In the file allocation table 310 shown in part (A) of FIG. 8, a FAT_ID 311 indicating one of clusters on the MO disk is associated and stored with a FAT value 312 indicating a cluster in which the data following data stored in the cluster indicated by the FAT_ID 311 is stored. The FAT_IDs 311 and FAT values 312 are two-digit hexadecimal numbers, the FAT_IDs 311 are sequential numbers in the same order as the order in which the clusters are arranged on the MO disk.

Characters such as h and j shown in part (A) of FIG. 8 represent the high order digit of two-digit hexadecimal numbers, where h<j. A cluster indicated by a FAT_ID 311 associated with a FAT value 312 of "XX" is a free area and a cluster indicated by a FAT_ID 311 associated with a FAT value 312 of "FF" is the end of an information file.

In directory information 320 shown in part (B) of FIG. 8, the file name 321 of an information file is associated and stored with a FAT entry 322 indicating a cluster containing the beginning of data constituting the information file indicated by the file name. While attributes representing information such as the name of a directory containing the information file are also expanded in the RAM 122, they are not used in the rearrangement process and therefore the illustration and description of which are omitted herein.

Part (C) of FIG. 8 shows four contiguous pieces of data 331, 332, 333, and 334 recorded in one or more contiguous clusters on an MO disk 1. Data 331 indicated by a thin solid line and data 332 indicated by a dashed line are fragments resulting from division of an information file named "aaaaa.aaa". Data 333 indicated by a thick solid line and data indicated by a double line constitute information files named "bbbbb.bbb" and "ccccc.ccc." Based on the state shown in parts (A), (B) and (C) of FIG. 8, the description of the rearrangement process will be continued below.

When the file allocation table 310 and directory information 320 are expanded in the RAM as described above, the value of pointer n is initialized to "0" (step S106). The value of pointer n is a two-digit hexadecimal number indicating a cluster to be rearranged and increments as rearrangement of the information file progresses. The assumption in FIG. 8 is that the pointer n has already been incremented to "h0."

Next, the FAT entries 322 stored in the directory information 320 expanded in the RAM are searched for the smallest value x equal to or greater than the value of pointer n (step S107). Step S107 is performed each time the pointer n reaches the end of an information file. If the smallest value x is not found (determination at step S108 is YES), then there are no discontiguous information files to which rearrangement has not been applied. Consequently, the rearrangement process will end.

On the other hand, if the smallest value x is found, the value of pointer n is compared with the smallest value x (step S109). If the value of pointer n is not equal to the smallest value x (determination at step S109 is NO), then there is a discontiguous free area or a fragment of an information file that follows the information file. Therefore, the beginning of the information file that follows the discontiguous free area or fragment is moved to the area that follows the previous information file in steps S110 to S113.

Referring to the example shown in FIG. 8, the pointer n has been incremented to value h0 as described above and the smallest value x is value h0 of the FAT entry 322 that is associated with file name "aaaaa.aaa." That is, the value of the pointer n is equal to the smallest value x. Consequently, the process proceeds to step S114. Step S114 and subsequent steps will be described first and steps S110 to S113 will be detailed later.

Referring to FIG. 8, if the value of pointer n (h0, in this example) is equal to the smallest value x (determination at step S109 is YES), then there is the beginning of the next information file following the previous information file. Therefore, no data is moved and the file allocation table 310 is referred to based on the smallest value x to see if the FAT value 312 associated with a FAT_ID 311 having the value equal to the smallest value x is value FF, which indicates the end of the information file (step S114). If the FAT value 312 is FF, then this means that the rearrangement process has been completed for a single information file. Accordingly, the pointer n is incremented (step S121) and the process returns to step S107, where a rearrangement process for the next information file is started.

Referring to FIG. 8, the FAT value 312 associated with a FAT_ID 311 that is equal to value h0 of pointer n is h1. If it is determined at step S114 that the FAT value 312 is not FF, like this case, then the end of the information file has not been reached yet. Therefore, it is determined whether the relationship between the FAT_ID 311 and the FAT value 312 is in an n to n+1 relationship (step S115). If the relationship between the FAT_ID 311 and FAT value 312 is in an n to n+1 relationship, then it means that contiguous data is stored in contiguous clusters. Therefore, data is not moved and the pointer n is incremented (step S121), then the process returns to step S114 and a rearrangement process for the next cluster is started.

Referring to FIG. 8, when the FAT_ID 311 is h0, the FAT value 312 is h1, representing an n to n+1 relationship. Accordingly, the pointer n is incremented to h1. Furthermore, when the FAT_ID 311 is h1, the FAT value 312 is h2, also representing an n to n+1 relationship. Accordingly, the pointer n is incremented to h2.

When FAT_ID 311 is h2, the FAT value 312 is j2. This does not meet the n to n+1 relationship. If it is determined that at step S115 that the relationship between the FAT_ID 311 and the FAT value 312 does not meet the n to n+1 relationship, like this case, then the information file is discontiguous. Therefore, data is moved as follows.

First, a FAT value y (j2, in this example) associated with the FAT_ID 311 that is equal to the value of pointer n (h2, in this example) is obtained. A FAT value 312 (j3, in this example) associated with the same FAT _ID 311 as the FAT value y is counterchanged with a FAT value 312 (h4, in this example) associated with the same FAT_ID 311 as the value of pointer n+1 (h3, in this example). Furthermore, the FAT value y (j2, in this example) is counterchanged with the value of pointer n+1 (h3, in this example) (step S116). Thus, the contiguous data portion of the information file is extended by one cluster.

In order to maintain contiguity with data moved to other places at step S116 to extend the contiguous data portion, the entire file allocation table 310 and directory information 320 are searched for FAT values 312 and FAT entries 322 that match the value of pointer n+1 (h3, in this example). All of FAT values 312 and FAT entries equal to n+1 are changed to the FAT value y (j2, in this example) (step S117).

After the completion of the modification to the file allocation table 310 and directory information 320 expanded in the RAM, data stored in a cluster on the MO disk that is identified by a FAT_ID 311 equal to the value of pointer n+1 (h3, in this example) is interchanged with data stored in a cluster identified by a FAT_ID 311 equal to the FAT value y (j2, in this example) (step S118).

The file allocation table 310 and directory information 320 expanded in the RAM and modified are imploded and written into the FAT area and directory area on the MO disk (step S119).

Data on the MO disk are also rearranged at steps S118 and S119.

After the rearrangement, the pointer n is incremented (step S121), then the process returns to step S114 and a rearrangement process for the next cluster is started.

In the example shown in FIG. 8, steps S114 to S120 are repeated and the pointer n is incremented to h3 to h4, and so on, and pieces of data constituting the information file "aaaaa.aaa" are rearranged so that the file "aaaaa.aaa" becomes a contiguous information file.

FIG. 9 shows the file allocation table (A) expanded in the RAM 122 after the information file "aaaaa.aaa" becomes contiguous, associated directory information (B) expanded in the RAM 122, and a storage state (C) of the information files according to the file allocation table and directory information, in the rearrangement process.

The file allocation table 310 shown in part (A) of FIG. 9 shows that data is contiguously stored from a cluster identified by a FAT_ID 311, h0, to a cluster identified by a FAT_ID 311, h4, and the end of the information file is stored in a cluster identified by the FAT_ID 311, h4. Referring to the directory information 320 shown in part (B) of FIG. 9, the file name of the information file starting with the FAT entry 322, h0, is "aaaaa.aaa." Accordingly, as shown in part (C) of FIG. 9, data 331 indicated by a thin solid line and data 332 indicated by a dashed line that constitute the information file having file name "aaaaa.aaa" are stored contiguously.

The rearrangement in which the data 332 indicated by the dashed line is joined with the data 331 indicated by the thin solid line causes data 333 indicated by a thick solid line to be moved from its original location.

Based on the state shown in parts (A), (B) and (C) of FIG. 9, the description of the rearrangement process will be continued below.

The pointer n has been incremented to h4. It is determined at step S114 in FIG. 7 that the FAT value 312 associated with the FAT_ID 311, h4, is FF. As a result, the process proceeds to step S121 in FIG. 6, where the pointer n is incremented to h5, then the process returns to step S107.

The smallest value x equal to or greater than the value h5 of the pointer n in the FAT entries 322 is value hp of the FAT entry 322 associated with file name 321 "ccccc.ccc." Because the smallest value x is present (determination at step S108 is NO), there is an additional information file to be rearranged. Because the value of pointer n is not equal to the smallest value x (determination at step S109 is NO), there is a discontiguous free area or a fragment of an information file that precedes the information to be rearranged. Therefore, a data movement operation at steps S110 through S113 is performed.

First, the smallest value x (hp, in this example) in the FAT entries 322 in the directory area 320 is replaced with the value of pointer n (h5, in this example) (step S110), then the storage location of the beginning of the information file is changed.

Then, in the file allocation table 310, the FAT value 312 of a FAT_ID 311 equal to the value of pointer n (h5) is interchanged with the FAT value 312 of a FAT_ID 311 equal to the smallest value x (hp), thereby moving the start data of the information file to the place following the previous information file. In order to maintain contiguity with data moved by this movement of the start data, the entire file allocation table 310 is searched for a FAT value 312 equal to the value of the pointer n (h5, in this example) and the FAT value 312 is replaced with the smallest value x (hp, in this example) (step S111).

After the completion of the modification to the file allocation table 310 and directory information 320 expanded in the RAM, data stored in a cluster on the MO disk identified by the FAT_ID 311 equal to the value of the pointer n (h5, in this example) is counterchanged with data stored in a cluster identified by the FAT_ID 311 equal to the smallest value x (hp, in this example) (step S112).

The file allocation table 310 and directory information 320 expanded and modified in the RAM are then imploded and written into the FAT area and directory area on the MO disk (step S113).

Through the process at steps S112 and S113, start data on the MO disk is also moved.

Then, a data portion to be made contiguous with the moved start data is joined with the start data through the process at steps S114 through S120 described above.

As a result of these steps, in an example shown in FIG. 9, data 334 constituting the information file named "ccccc.ccc" is stored in the place immediately following the information file named "aaaaa.aaa."

FIG. 10 shows the file allocation table (A) expanded in the RAM 122 after the information file "ccccc.ccc" is made contiguous with the end of the information file "aaaaa.aaa,"

the associated directory information (B) expanded in the RAM 122, and a storage state (C) of the information files according to the file allocation table and directory information.

The file allocation table 310 shown in part (A) of FIG. 10 shows that the end of an information file is stored in a cluster identified by a FAT_ID 311, h4, and one cluster of data of an information file is stored in a cluster identified by a FAT_ID 311, h5, immediately following that cluster. Referring to the directory information 320 shown in part (B) of FIG. 10, the information file named "ccccc.ccc" begins with a FAT entry 322, h5. Accordingly, data 334 indicated by a double line, which constitutes the file "ccccc.ccc", is stored in the place immediately following data 332, which is indicated by a dashed line and is the last half of the information file "aaaaa.aaa," as shown in part (C) of FIG. 10.

The rearrangement process is repeated until rearrangement of all the clusters of all information files is completed. As a result, data 333 indicated by a thick solid line, constituting the information file "bbbbb.bbb" is stored in the place immediately following the data 334 indicated by a double line. Thus, every information file becomes contiguous and discontiguous free areas are eliminated.

The rearrangement process described above is automatically performed during a time period in which no commands are provided from the host. Thus, discontiguous free areas and information files are automatically eliminated while the MO drive is left powered on and in an idle state, thereby improving the throughput of the MO drive.

If a command is sent from the host during the rearrangement process described above, an interrupt occurs to free the RAM and a process according to the command is performed first. However, if write operations to the MO disk, which may be performed at steps S112 and S113 and steps S118 and S119 of the rearrangement process, are suspended, the file system or data can be corrupted and some information files or the entire MO disk can become unreadable or unwritable.

Therefore, write operations at steps S112 and S113 and steps S118 and S119 are continued even if an interrupt occurs due to a command sent from the host. After the completion of the write operations, the RAM is freed and a process according to the command is performed. This arrangement allows the MO drive to respond to a command from the host without any substantial delay while maintaining integrity of the file system and data on the MO disk.

The MO drive illustrated herein is used as an auxiliary recording device independent of the host, like other typical MO drives. The rearrangement process described above is performed internally in the MO drive and whether it is performed or not is obscured from the outside (host or user). Therefore, there is a possibility that the user turns off the MO drive while the rearrangement process is being performed by the MO drive. If power is turned off during operations at steps S112 and S113 or steps S118 and S119, the file system or data can be corrupted. According to the present embodiment, corruption of the file system and data is prevented by adding a mechanism to the power supply.

Figure 11:
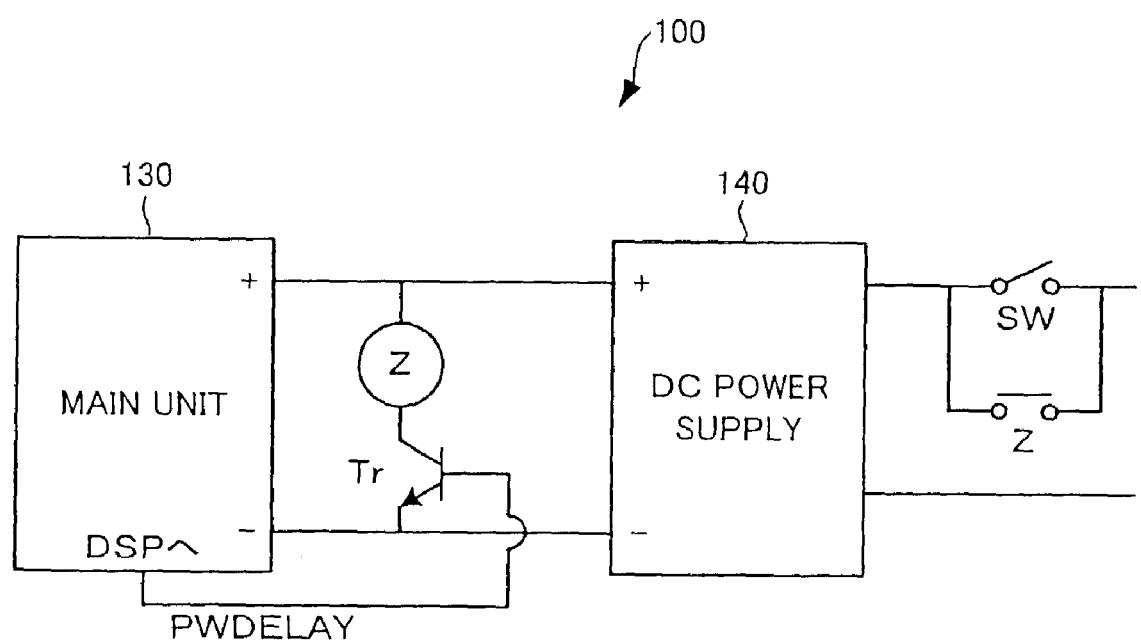
FIG. 11 shows a power supply contained in the MO drive of the present embodiment.
Figure 12:
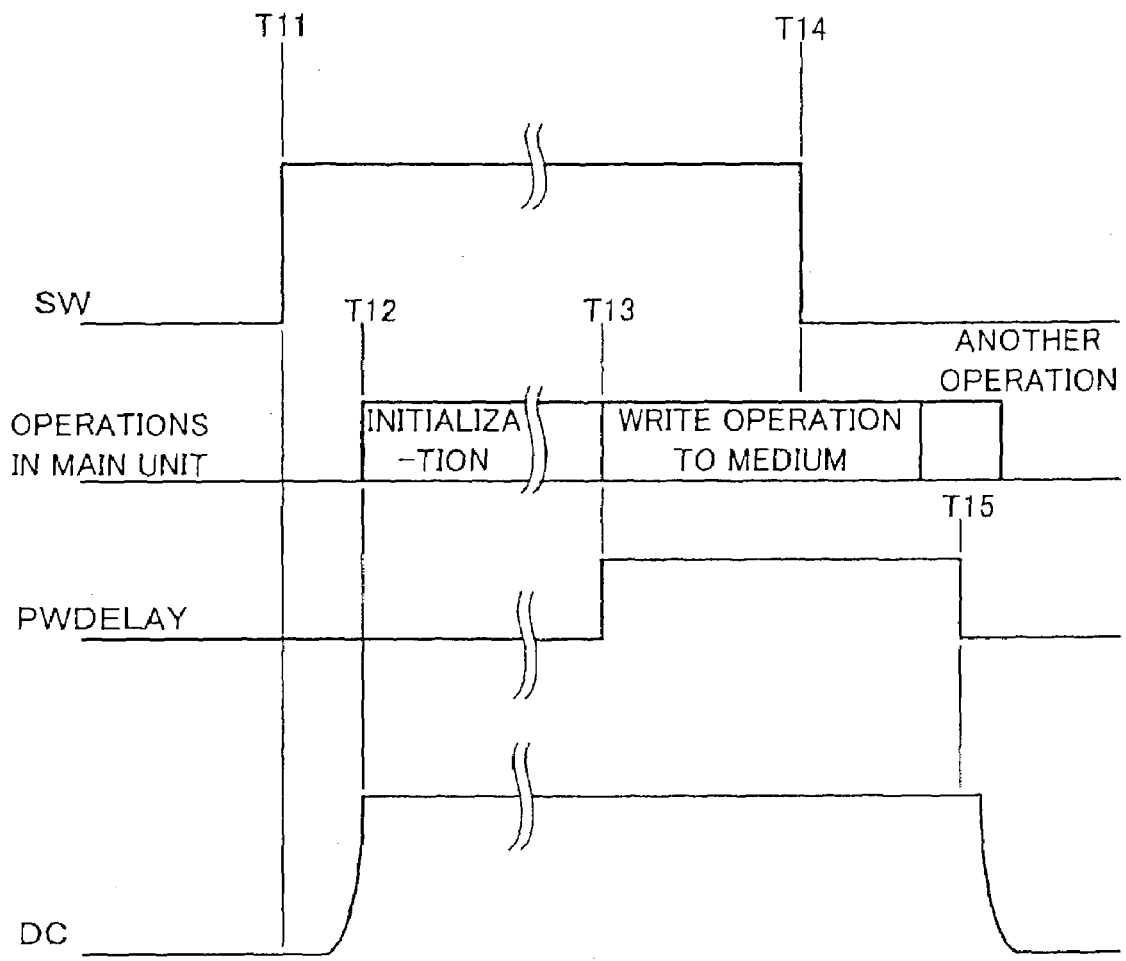
FIG. 12 shows a time chart of an operation in the power supply.

FIG. 11 shows a power supply contained in the MO drive of the present embodiment. FIG. 12 shows a time chart of an operation in the power supply.

Provided in the MO drive 100 are a main unit 130 including the circuit shown in FIG. 4 and the like, a DC power supply 140 for supplying a direct current to the main unit 130, a first switch SW operated by a user for turning on/off the DC power supply 140, and a second switch Z for turning on/off the DC power supply 140 in response to a delay control signal PWDELAY provided from the DSP in the main unit 130.

The time chart shown in FIG. 12 shows operation timings of the first switch SW, main unit 130, delay control signal PWDELAY, and DC power supply 140 shown in FIG. 11.

First, when the user operates the first switch SW to turn on the power supply 140 at time T11, the DC power supply starts to supply a direct current and the main unit starts initialization at time T12. Then, the MO drive continues operating and the rearrangement process described above is started. At time T13, a write operation to an MO disk is started at any of steps S112 and S113 and steps S118 and S119 and a delay control signal PWDELAY is provided from the DSP. While the delay control signal PWDELAY is being provided, an electric current is being supplied to the relay coil of the second switch Z shown in FIG. 11 and the second switch Z remains in the on-state.

At time T14 during the write operation to the MO disk, even if the user operates the first switch SW to turn off the power supply 140, because the delay control signal PWDELAY is being provided, the second switch Z remains in the on-state and the write operation to the MO disk is continued. After the completion of the write operation, the DSP stops providing the delay control signal PWDELAY at time T15. As a result, the second switch Z is turned off, the DC power supply stops supplying the direct current, and the MO drive comes to a stop.

The above described mechanism in the power supply in the MO drive 100 of the present embodiment can prevent corruption of the file system and data on an MO disk due to power-off by a user operation, which can be performed at any time.

Another embodiment of the present invention will be described below. Hardware configuration in this alternative embodiment is the same as that of the above described embodiment. Operations other than rearrangement are the same as those in the above described embodiment and therefore the description of which will be omitted.

Figure 13:
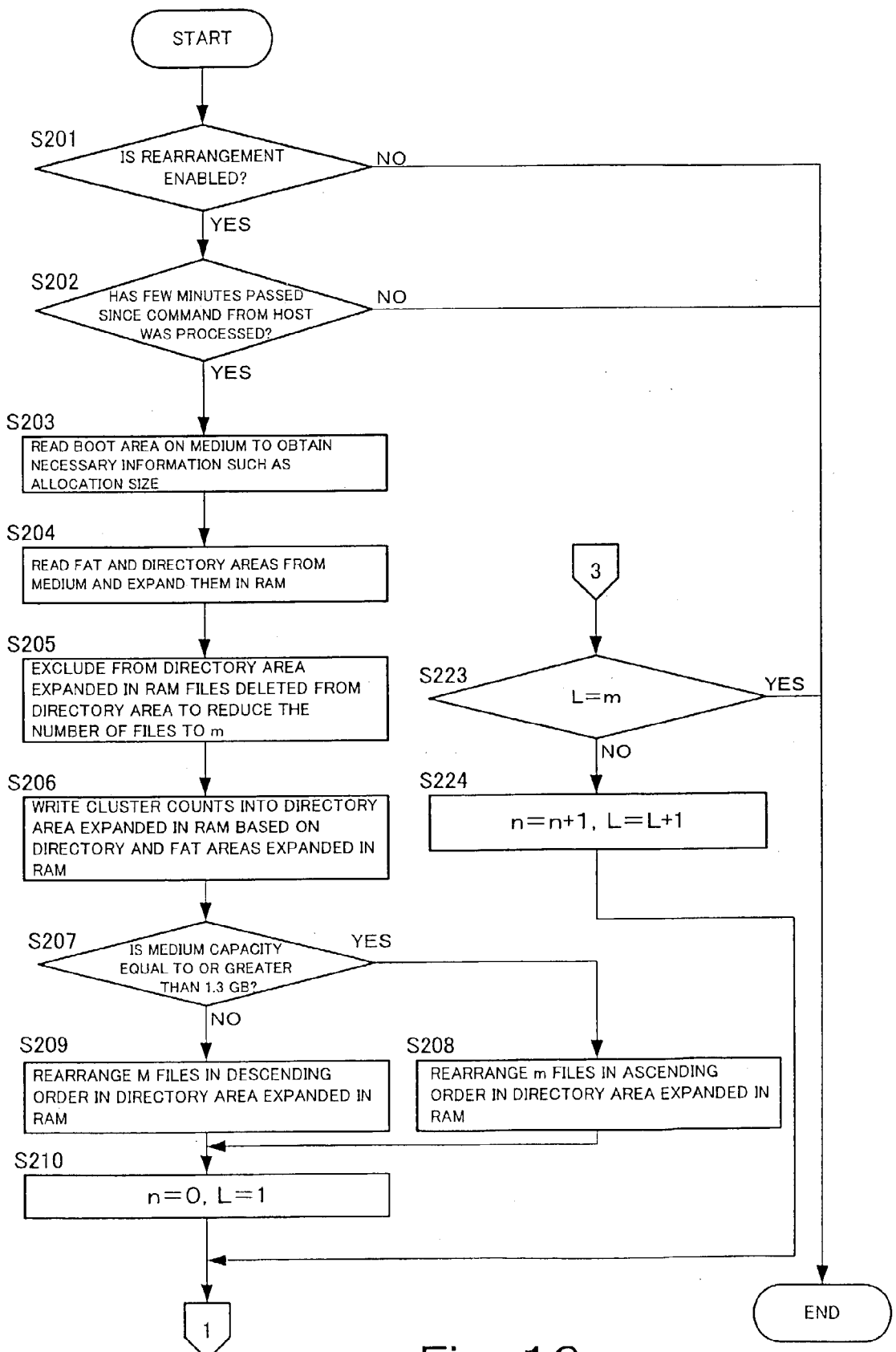
FIG. 13 shows a flowchart of a first half of a rearrangement process according to an alternative embodiment.
Figure 14:
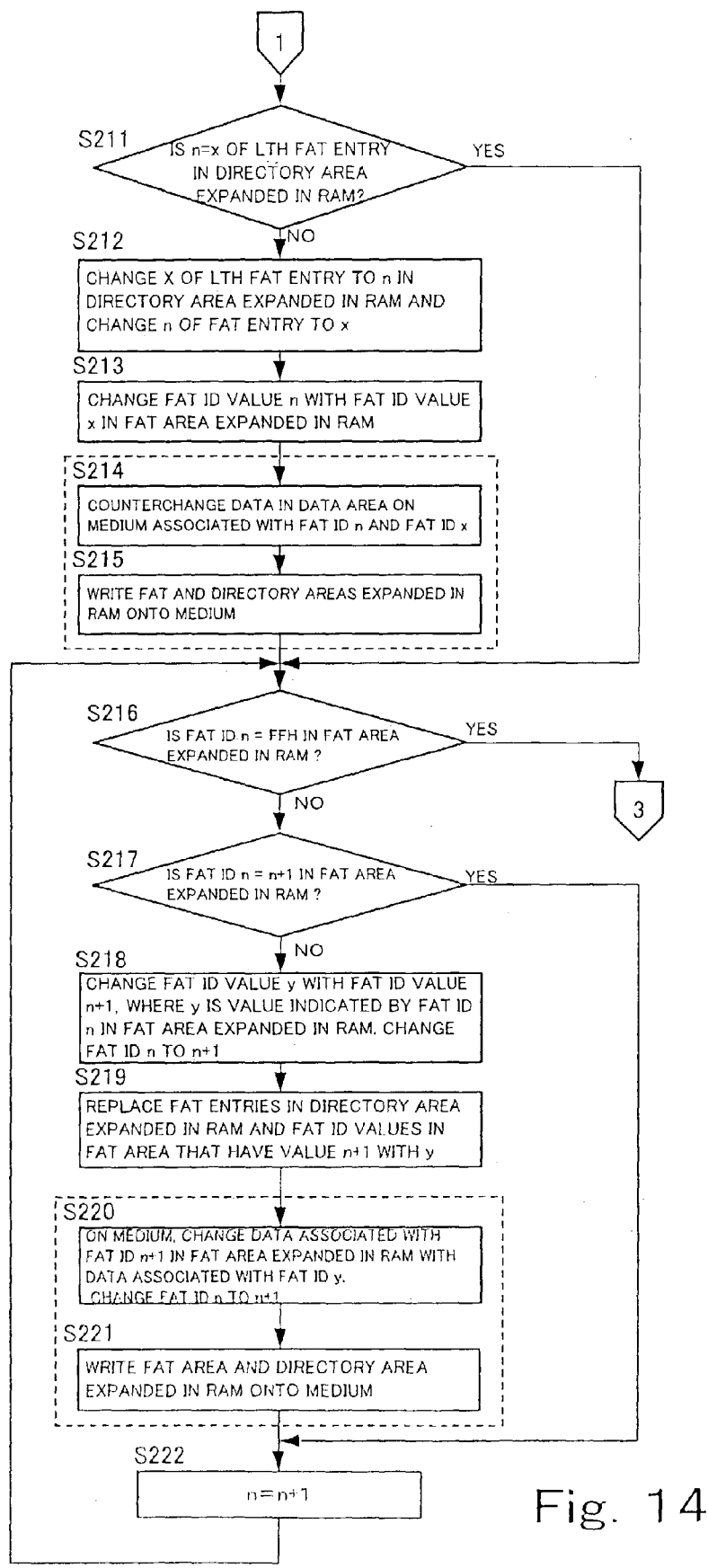
FIG. 14 shows a flowchart of a second half of the rearrangement process according to the alternative embodiment.

FIGS. 13 and 14 show flowcharts of a rearrangement process according to the alternative embodiment. The flow of the process continues from step S210 in FIG. 13 to step S211 in FIG. 14.

Steps S201 through S205 in this rearrangement process are exactly the same as steps S101 through S105 in FIG. 6.

The process will be described with the assumption that m information files to be rearranged are left after unnecessary files are removed from directory information on the RAM at step S205 in FIG. 13.

The number of clusters constituting each of the m information files is obtained and added to the directory information on the RAM (step S206). The number of clusters of each information file can be obtained by tracing clusters from FAT entries of the information files in a file allocation table expanded in the RAM.

Figure 15:
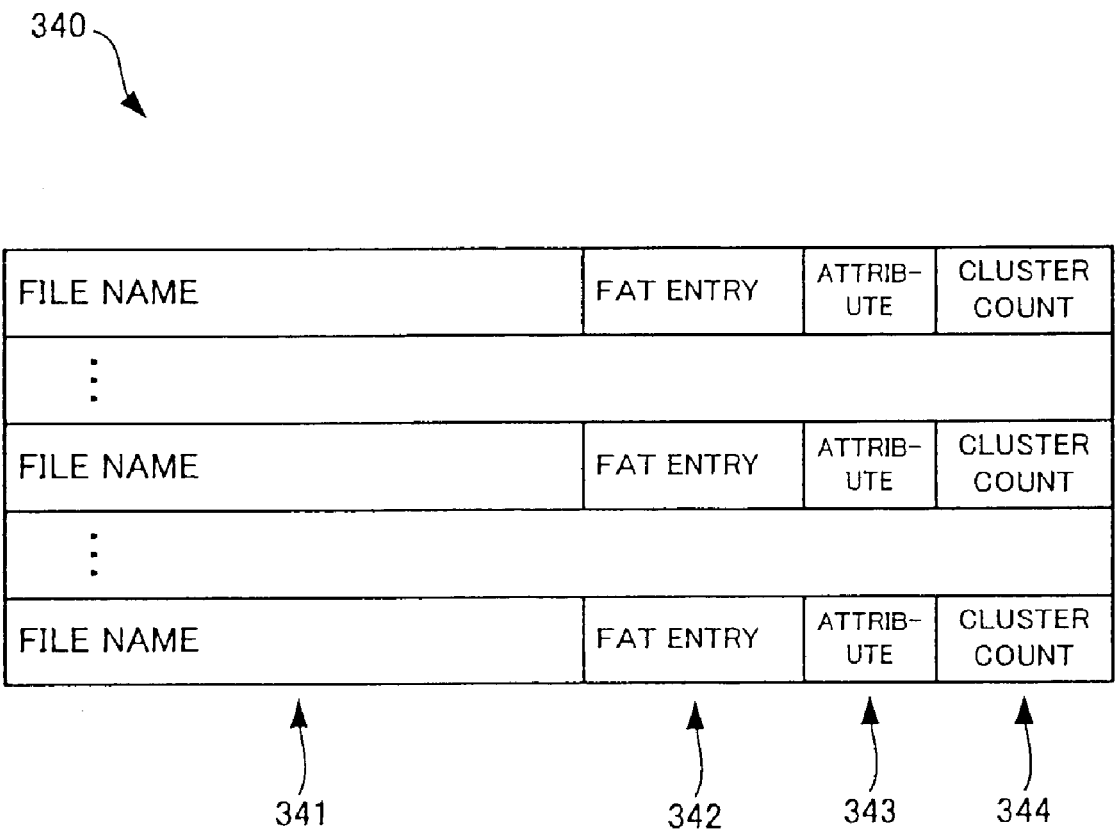
FIG. 15 shows directory information to which cluster counts are added.

FIG. 15 shows the directory information to which cluster counts are added.

In the directory information 340, the file names 341 of information files are associated and stored with FAT entries 342 of information files indicated by the file names in the directory information 340, like the directory information 310 shown in part (B) of FIG. 8. FIG. 15 also shows attributes 343, which are omitted in part (B) of FIG. 8. Cluster counts 344 added at step S206 are also shown in FIG. 15. The size of each information file can be roughly determined by referring to its cluster count 344.

When the cluster counts 344 are added to the directory information 340, it is determined whether the storage capacity of the MO disk is equal to or greater than 1.3 GB (step S207). The storage capacity of the MO disk can be recognized by determining the spacing between IDs recorded on the MO disk or reading information recorded in a control track on the MO disk. Technologies used for this determination are well known and therefore further description of which will be omitted. If the storage capacity recognized is equal to or greater than 1.3 GB (determination at step S207 is YES), m pieces of data stored in the directory information expanded in the RAM are rearranged in ascending order of cluster count (step S208). On the other hand, if the storage capacity recognized is less than 1.3 GB (determination at step S207 is NO), m pieces of data stored in the directory information expanded in the RAM are rearranged in descending order of cluster count (step S209). After the completion of either rearrangement, the information files are rearranged in an appropriate order according to the type of the MO disk through the following process.

After the rearrangement, the value of pointer n is initialized to 0 and the value of pointer L is initialized to 1 (step S210). As described earlier, pointer n indicates a cluster to be rearranged. Pointer L introduced in the present embodiment indicates an information file to be rearranged.

Then, the FAT entry value x of the Lth information file is obtained from the directory information expanded in the RAM and the value x is compared with the value of pointer n (step S211). Step S211 is equivalent to step S109 in FIG. 6, except that the value x of the FAT entry of the Lth information file is used instead of the smallest value x. In particular, data is rearranged not only if a discontiguous free area or a fragment of the information file precedes the Lth information file but also if another information file precedes it.

Subsequent steps S212 through S222 are exactly the same as steps S110 through S120 in FIG. 7, where start data and discontiguous information files are rearranged so as to become contiguous.

After one information file is made contiguous, it is determined at step S216 that the FAT value is FF at step S216. If the value of pointer L has not reached m (determination at step S223 is NO), the pointers n and L are incremented (step S224). Then, the process returns to step S211 and the above described process is repeated.

On the other hand, if it is determined at step S223 that the value of pointer L has reached m, this means that rearrangement of all the information files in all the clusters is completed. Therefore the rearrangement process will end.

As with the rearrangement process shown in FIGS. 6 and 7, even if an interrupt occurs in response to a command from the host in the rearrangement process shown in FIGS. 13 and 14, steps S214 and S215 and steps S220 and S221 take priority.

Figure 16:
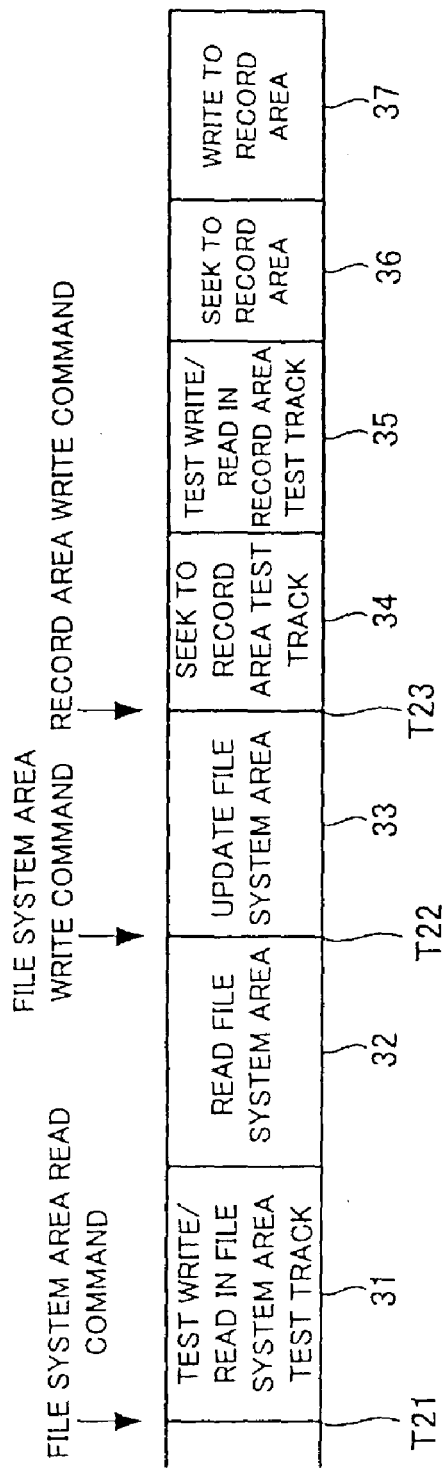
FIG. 16 shows a time chart of a write of an information file after the rearrangement process.
Figure 17:
FIG. 17 shows a time chart of a read of an information file after the rearrangement process.

FIGS. 16 and 17 illustrate effects of the rearrangement processes according to the above described embodiments. FIG. 16 shows a time chart of a write of an information file and FIG. 17 shows a time chart of a read of an information file.

In a write operation of an information file, the host provides at time T21 the address of the file system area to the MO drive and issues an instruction for reading data stored in that address. The MO drive performs a test write/read (step 31) in a test track in the file system area to obtain conditions such as an optimum write power, read power, and reproduction magnetic field in order to access the file system area. The MO drive then reads the file system area (step 32) under the conditions and sends the read data to the host. The host determines based on the sent data that a storage area is contiguous and, at time T22, issues a command for adding file system information representing an information file to be written into the storage area to the file system area. The MO drive receives the command and updates (step 33) the file system area. At time T23, the host indicates the address of the storage area to the MO drive and sends write data constituting the information file. The MO drive seeks (step 34) to a test track in the zone containing the storage area and performs a test write/read (step 35) in that test track to obtain conditions such as optimum write power. The MO drive then seeks (step 36) to the storage area and uses the conditions obtained in the test write/read (step 35) to write (step 37) the write data into the storage area. In this way, only a minimum number of seeks and test writes/reads are performed. Accordingly, higher throughput can be achieved.

In a read operation of an information file, the host provides at time T24 the address of the file system area to the MO drive and issues an instruction for reading data stored in that address. The MO drive performs a test write/read (step 38) in a test track in file system area to obtain conditions such as optimum write power, read power, and reproduction magnetic field for reading the file system area. The MO drive then reads (step 39) the file system area under the conditions and sends the read data to the host. The host determines based on the sent data that the information file is stored contiguously. At time T25, the host indicates the address of a storage area to the MO drive and instructs the MO drive to read data stored in that storage area. The MO drive seeks (step 40) to a test track in a zone containing the storage area and performs a test write/read (step 41) in the test track to obtain conditions such as optimum write power. The MO then seeks (step 42) to the storage area and uses the conditions obtained in the test write/read (step 41) to read (step 42) data stored in the storage area. In this way, also in the information file read operation, only a minimum number of seeks and test writes/reads are performed. Accordingly, higher throughput can be achieved.

The present invention is advantageous especially when being applied to an information storage device designed to improve the reliability of data recording and reproduction by changing condition settings through test writes and reads. The present invention can eliminate the need for multiple test writes and reads in different zones, thereby reducing processing time of the device, improving response time to a host, and preventing a timeout error (a processing time overrun). Thus, throughput can be improved without impairment of the reliability of recording and reproduction.

While the embodiments described above are premised on a FAT 16 file system, essentially the same rearrangement process can be applied to a case where a FAT 32 file system is used in place of the FAT 16 file system, with the only difference that 32-bit data is handled instead of 16-bit data. The essential concept of the present invention is the same for other file systems.

While data is rearranged on a cluster basis in the embodiments described above, data may be rearranged in several clusters at a time if the data extends across that several clusters in an information storage device according to the present invention.

While the embodiments have been described with respect to an MO disk by way of example of a recording medium as used herein, the recording medium may be a magneto-optical disk using any of recording technologies, including magneto-optical recording, phase-change recording, and magnetic recording technologies, or another disk-type recording medium including an optical disk or magnetic disk. Also, it may be a recording medium in other forms such as a card or tape medium.

What is claimed is:

1. An information storage device that at least performs a write of an information file onto a recording medium in accordance with an instruction sent from a higher-level device, comprising:
    a determination section that determines whether the storage device is in an idle state;
    a component rearrangement section that rearranges components of an information file to transform the information file whose components are discontiguously stored on said recording medium into an information file whose components are stored contiguously, if said determination section determines that the storage device is in said idle state;
    wherein transformation is conducted independent of the higher-level device so that the higher-level device is capable of executing some processing during continuing transformation;
    a first switch that turns on and/or off a power supply in response to an operation;
    a second switch provided in parallel with said first switch that turns on and/or off the power supply in response to a control signal; and
    a switch controller that suspends rearrangement of the components at a time when a read or write performed on an information file subject to the rearrangement occurs, and then provides a control signal to said second switch that maintains said second switch turned on until completion of said write performed on said information file subject to the rearrangement if said first switch is turned off in response to said operation occurring prior to said completion of said write performed on said information file subject to the rearrangement.

2. The information storage device according to claim 1, wherein said recording medium is a recording medium selected from a group consisting of a plurality of types of recording media; and said information storage device further comprises a file rearrangement section that rearranges a plurality of information files recorded on said recording medium in an order according to the type of said recording medium.

3. The information storage device according to claim 1, wherein said recording medium is a magneto-optical recording medium.

4. The information storage device according to claim 1, wherein said recording medium is a recording medium selected from a group consisting of a plurality of types of recording media and a recording area thereof is divided into a plurality of zones; and said information storage device further comprises a file rearrangement section that rearranges a plurality of information files recorded on said recording medium in an order according to the type of said recording medium so as to lower a possibility of the information files being extended across said zones.

* * * * *